United States Patent [19]

Cooper

[11] Patent Number: 4,799,370
[45] Date of Patent: Jan. 24, 1989

[54] VIDEOCASSETTE SECURITY-LOCK-BOX

[76] Inventor: George R. Cooper, 683-½ W. Moorland Cir., Grand Junction, Colo. 81504

[21] Appl. No.: 84,200

[22] Filed: Aug. 12, 1987

[51] Int. Cl.⁴ .............................................. E05B 65/52
[52] U.S. Cl. .......................................... 70/63; 70/57; 70/58; 70/159
[58] Field of Search .............. 70/57, 58, 63, 158–162; 206/387; 220/331

[56] References Cited

U.S. PATENT DOCUMENTS

| | | | |
|---|---|---|---|
| 1,189,902 | 7/1916 | Armstrong | 70/161 |
| 1,328,109 | 1/1920 | Whitlock | 70/159 X |
| 1,758,361 | 5/1930 | Frost | 70/161 X |
| 3,391,256 | 7/1968 | Nawman | 70/63 X |
| 3,436,937 | 4/1969 | Barrett | 70/63 |
| 3,532,211 | 10/1970 | Gellert | 206/387 |
| 3,587,837 | 6/1971 | Smith et al. | 206/387 X |
| 3,934,434 | 1/1976 | Law | 70/63 |
| 3,979,932 | 9/1976 | Piche | 70/63 |
| 4,051,790 | 10/1977 | Meditz et al. | 70/63 X |
| 4,084,865 | 4/1978 | Joyce | 206/387 X |
| 4,194,775 | 3/1980 | Shea | 70/63 X |
| 4,285,429 | 8/1981 | MacTavish | 70/63 X |
| 4,313,321 | 2/1982 | Wasser | 70/159 |
| 4,375,850 | 3/1983 | Smyth et al. | 206/387 |
| 4,406,358 | 9/1983 | Zahradnik | 70/159 X |
| 4,423,812 | 1/1984 | Sato | 206/387 |
| 4,469,345 | 9/1984 | Weiss | 70/63 X |
| 4,493,268 | 1/1985 | Sidler | 70/63 X |
| 4,502,306 | 3/1985 | Scamacca | 70/159 |
| 4,532,783 | 8/1985 | Maurice | 70/63 |

FOREIGN PATENT DOCUMENTS 696488  10/1964  Canada ................................. 70/161

Primary Examiner—Robert L. Wolfe
Assistant Examiner—Suzanne L. Dino
Attorney, Agent, or Firm—Richard C. Litman

[57] ABSTRACT

A videocassette security box includes a base with a protective cover pivotally attached thereto and adapted to contain videocassettes. A key-hole orifice through the base allows mounting of the base over a doorknob or other suitable mounting member whereafter the narrower portion of the key-hole is moved behind the doorknob. Closing of the cover blocks across to the larger portion of the key-hole to preclude removal of the box from the doorknob as long as the cover remains closed while a lock mechanism allows securing of the cover in the closed position.

4 Claims, 2 Drawing Sheets

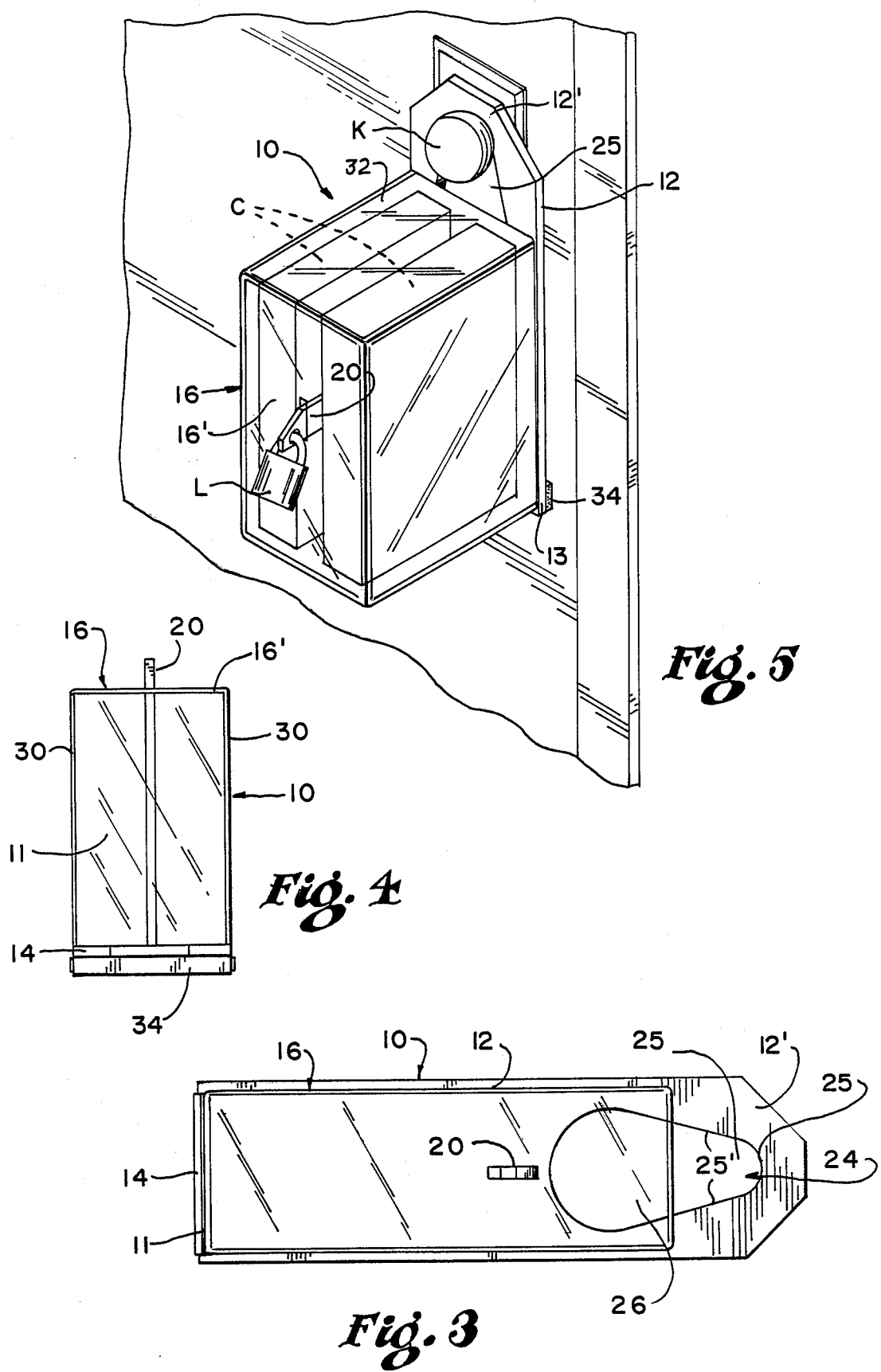

VIDEOCASSETTE SECURITY-LOCK-BOX

BACKGROUND OF THE INVENTION

Field of the Invention

This invention relates to security devices or boxes and specifically relates to a device for the safe and convenient storage of videocassette tapes such as are rented by numerous retail and wholesale outlets.

At the present time a videotape user, that is, a renter of a movie, for example from a video outlet, must travel to the outlet, rent the tape and then travel back again to return it. This process of travelling, added to the rental charge for the tape, reduces the number of potential customers for the video rental industry and results in suppression of rental costs charged by the rental outlets. More people for example, may be induced to rent movies and other taped videocassette recorder entertainment and may be willing to pay additional rental charges, if a convenient delivery and/or pick-up service existed that, as the name implies, would provide for delivery of a tape to a residence or commercial structure and/or would pick up the tape again on a predetermined basis.

A service of this type would add greatly to the convenience of renting a tape, freeing as it would the necessary trips possibly both ways from home to outlet and back again with the tapes. However, to make a video delivery and/or pick-up service a reality, a truly convenient and safe means must be provided for the temporary and secure storage of the tapes outside the customer's dwelling or building.

The present device allows a customer to place an order by phone for a rental tape, have the tape or tapes delivered to the residence or other building, such as a commercial or government building, and/or be retrieved by the rental outlet. The customer would place the tape back in the securing device when finished with the viewing of it, making it available for retrieval by the

DESCRIPTION OF THE PRIOR ART

Various lock-up devices have been known, both patented and unpatented, for many years. The following recited references are examplary of the U.S. prior art. They are:

U.S. Pat. No. 3,436,937 to Barrett discloses a key safe having a hollow box to contain a special key and mounted by means of a shackle.

U.S. Pat. No. 3,532,211 to Gellert teaches a protective case for a tape cassette which has a cover pivotable to an open position by single-handed squeezing action of the use.

U.S. Pat. No. 3,979,932 to Piche discloses a combination lock key safe that includes telescoping inner and outer stamped sheet metal cylinders, the outer one of which releasably carries a U-bolt shackle for securing the key safe to a mounting member such as a door knob.

The above examples of security boxes fall short of providing the improved features of a security box capable of holding videocassettes as presented herein.

SUMMARY OF THE INVENTION

An object of the present invention is to provide an improved construction for a videocassette security device such that a tape left in the device will be protected from theft.

Another object of the present device is to provide for the safety of videocassettes from rain, snow, dust, sunlight and other natural elements.

A further object of the present device is to provide for the convenient mounting of a security apparatus on any suitable mounting surface, such as a doorknob.

A still further object of the device is to provide for the physical protection of fragile tapes by a construction resistant to the accidental damage of the tapes.

DESCRIPTION OF THE DRAWINGS

FIG. 3 is a front view of the device showing the relationship between the base protective cover, when closed, and a planar base orifice or passageway through the base.

FIG. 4 is a bottom elevational view showing the protective cover and a lockable extension protruding through and above the protective cover.

FIG. 5 is a perspective view of the device in use as attached, by way of example, to a doorknob and secured by a lock device.

DESCRIPTION OF THE PREFERRED EMBODIMENT

Figure 1:
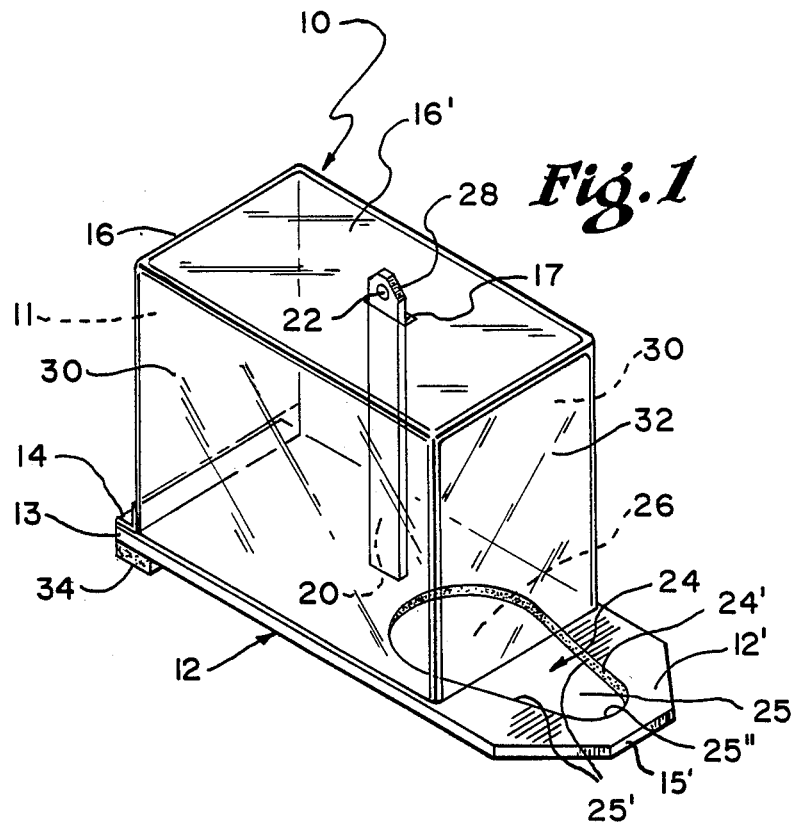
FIG. 1 is a perspective of the device according to the present invention.
Figure 2:
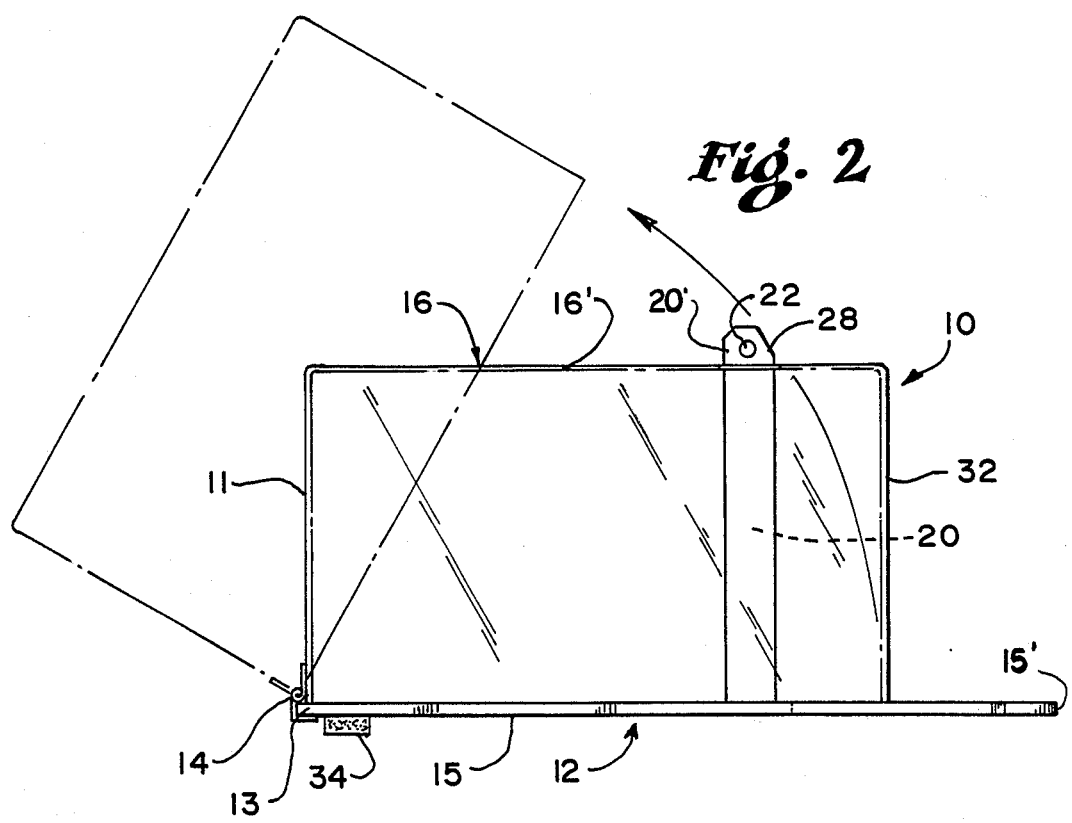
FIG. 2 is a side elevational view indicating in broken lines the base protective cover alternate positions of pivotally attached to a planar base.

Referring now to the drawings, the videocassette security lock box apparatus 10 includes a planar base 12 having a lower edge 13 and an opposite upper edge 13'. A base protective cover or cassette housing 16 is pivotally mounted to the base by hinge means 14. Such means may comprise a piano hinge and joins the bottom cover wall 11 to the lower edge 13 of the base 12.

The base protective cover 16 includes an outer wall 16' joined to the bottom wall 11 as well as to two side walls 30—30 and a top wall 32 as shown in FIG. 1.

The outer wall 16' is provided with an elongated orifice 17 through which a lockable extension member 20 projectors or protrudes when the cover is in the closed position, in engagement with the base 12. The lockable extension 20 is rigidly attached to the planar base 12 at a point preferably closer to the cover top wall 32 than the cover bottom wall 11. This disposition minimizes the length of the orifice 17 needed to clear the lockable extension 20 during operation of the device.

Lockable extension 20 includes a bevel or mitre 28 in the direction of the cover top wall 32 such that the cover 16 can be freely displaced over the lockable extension 20 when the base cover 16 is swung upward to engage the planar basee 12. A lock receiving hole 22 is formed through the free end 20' of the extension and accommodates a conventional padlock or other suitable removable locking device L. Quite obvioutsly, the orifice 22 must be disposed above or ouside the base protective cover outer wall 16' when the cover is closed or moved into contact with the base 12.

The base 12 includes a top tab portion 12' extending beyond the cover top wall 32. A key-hole cut-out 24 in the base 12 includes a relatively narrow elongated opening 25 having downwardly and outwardly divergent side walls 25' and which communicates with an enlarged, generally cylindrical opening 26 as shown mostly clearly in FIGS. 1, and 3. The enlarged opening 26 will be understood to be of a diameter sufficient to freely pass over a conventional door knob K while the adjacent tapered or elongated opening 25 is a width decidedly less than that of a door knonb key accommodates the width of the shank immediately behind a knob K. In this manner, the lock box is quickly attachable to a door knob K by opening the cover 16 and placing the base enlarged opening 26 over and then behind a knob K following which the base 12 is lowered until the endmost portion 25" of the opening 25 rests upon the shank behind the knob K.

The box user inserts or removes one or more cassettes C from the interior chamber 30 of the cover 16 and then closes the cover to the position of FIGS. 1 and 5 wherein it will be seen that with the cover top wall 32 abutting the base 12, the knob K is precluded from either accidentally or forcefully entering the enlarged opening 26. Thereafter, applying a locking device L through the opening 22 of the extension 20 will secure the cover 16 in the closed position and ensure the security of the cover contents as the base tab portion 12' is captively retained behind the door knob K.

The peripheral edge of the key-hole cut-over 24 is preferably covered by any suitable anti-scuffing material 24' such as rubber, to prevent rattling of the box and marring of the door hardware. Additionally, a protective cushion strip 34 is applied to the base undersurface 15 adjacent the hinge 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications, and equivalents which may be resorted to, fall within the scope of the invention.

What is claimed is:

1. A videocassette security box adapted to be removably affixed to a doorknob or other enlarged mounting member comprising;
   a substantially planar elongated unitary base having opposite lower and upper edges,
   a substantially rectangular protective cover defining a box having an interior chamber and pivotally attached to said base adjacent said lower edge and adapted to house at least one videocassette,
   said cover having a bottom and opposite top wall, an outer wall on said cover joining said bottom and top walls and provided with an orifice,
   said base provided with a generally key-hole shaped opening including an enlarged portion communicating with a narrower elongated portion, said opening elongated portion disposed adjacent said base upper edge,
   said cover closeable to a position with said top wall spanning said key-hole opening with at least a substantial part of said opening enlarged portion contained between said cover bottom and top walls and communicating with said interior chamber while at least a part of said opening elongated portion remains exposed exposed outside the bounds of said cover adjacent said top wall,
   a lock extension member attached to and projecting from said base, said extension member having a free end provided with an opening adapted to receive securing means to retain said cover in a closed position whereby,
   opening of said cover permits placement of said base opening enlarged portion over and behind a doorknob or other enlarged mounting member prior to movement of said plate to position said opening narrower elongated portion behind the doorknob or other enlarged mounting member following which closing of said cover blocks removal of said security box without first opening said cover to permit movement of said plate.

2. A videocassette security box according to claim 1 wherein, said base includes an undersurface, and a cushion strip attached to said undersurface adjacent said lower edge of said base.

3. A videocassette security box according to claim 1 including, a protective layer surrounding at least a portion of said keyhole shaped opening.

4. A videocassette security box according to claim 1 wherein, said opening elongated portion includes a pair of divergent side edges.

* * * * *